J. E. KING.
ELECTRIC LOAD DISTRIBUTER.
APPLICATION FILED FEB. 24, 1913.
1,199,571.
Patented Sept. 26, 1916.
2 SHEETS—SHEET 1.
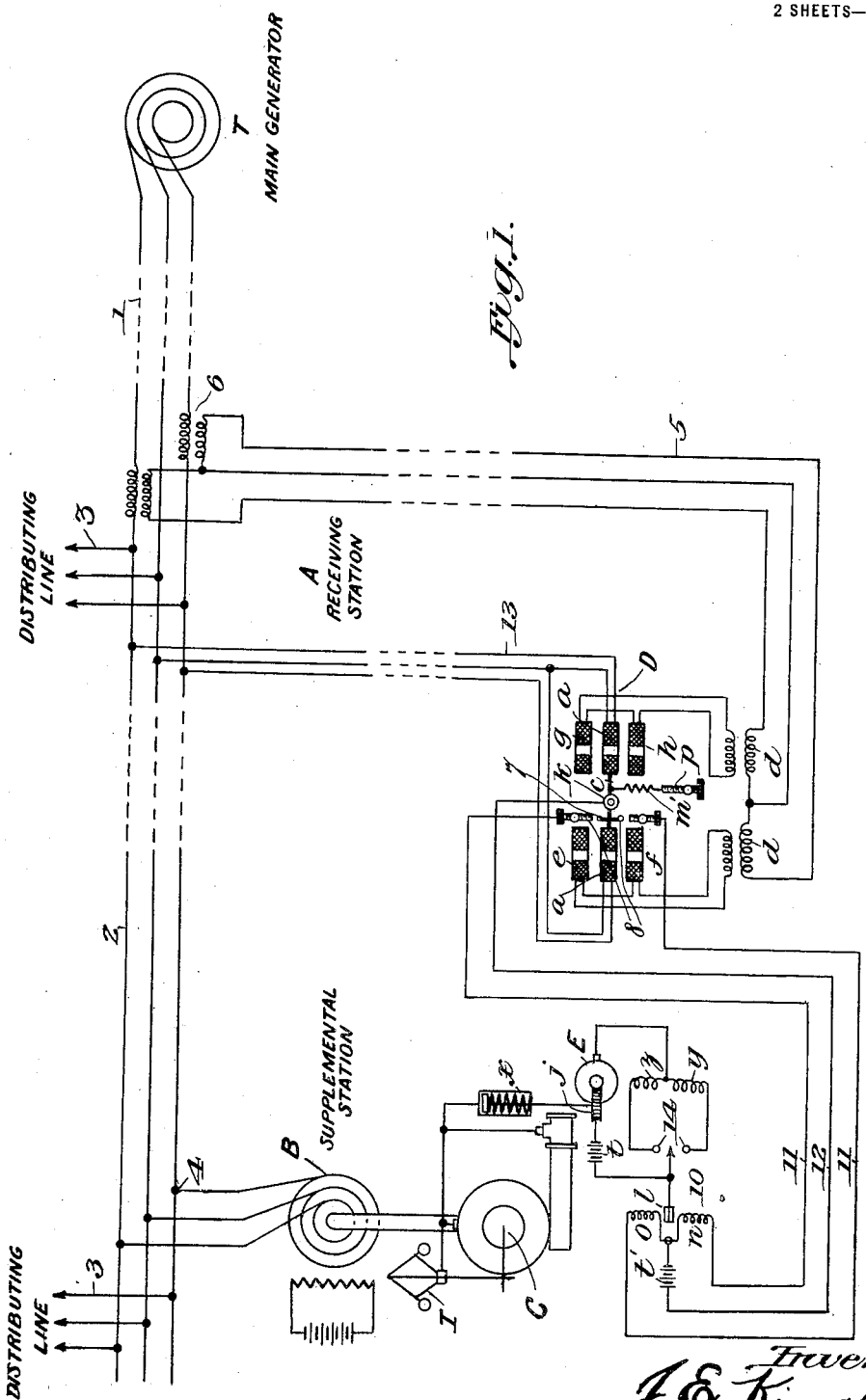

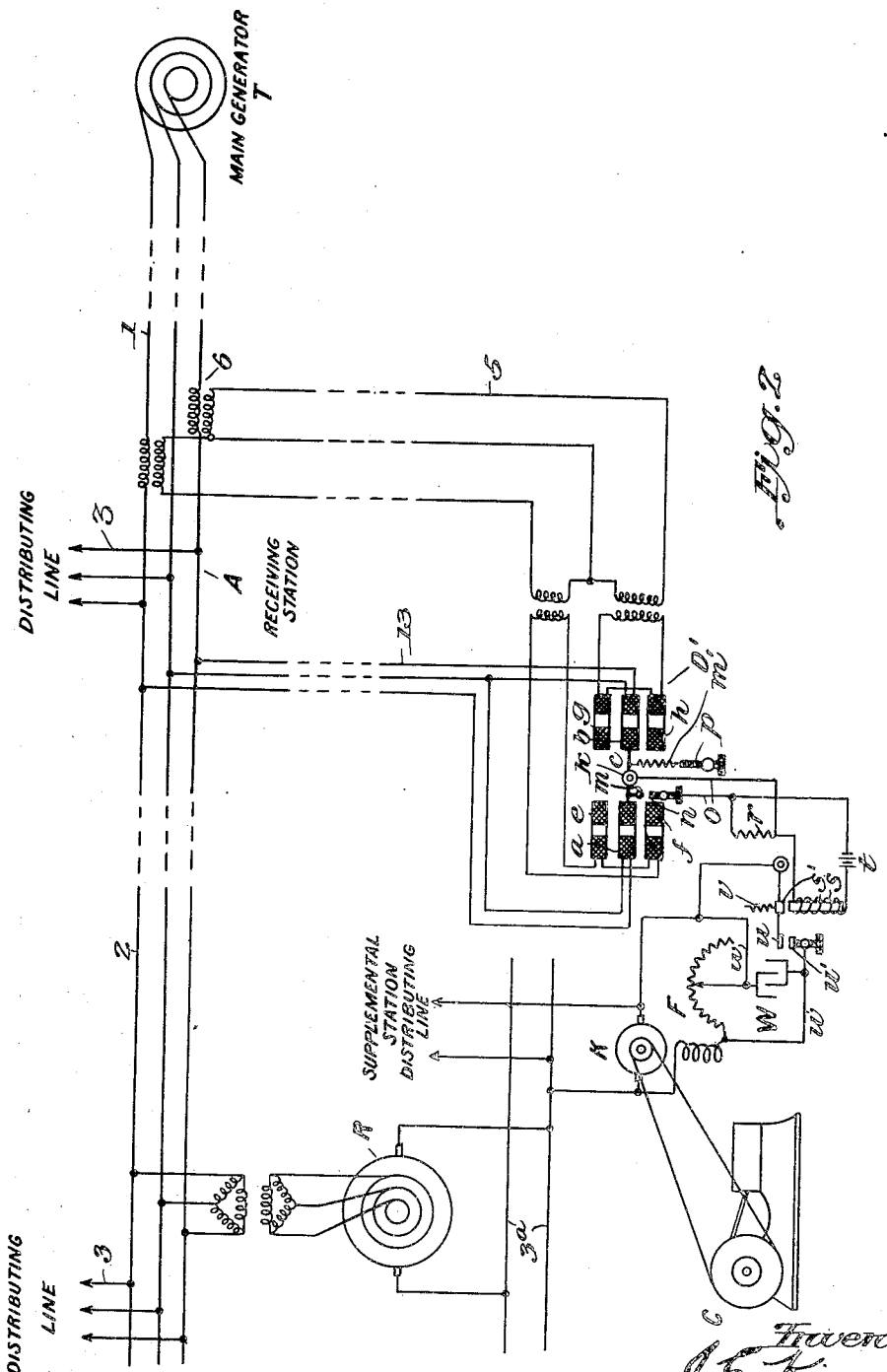

UNITED STATES PATENT OFFICE.

JESS E. KING, OF SYRACUSE, NEW YORK, ASSIGNOR OF ONE-HALF TO WALTER C. PEARCE, OF SYRACUSE, NEW YORK.

ELECTRIC LOAD-DISTRIBUTER.

1,199,571.  Specification of Letters Patent.  Patented Sept. 26, 1916.

Application filed February 24, 1913. Serial No. 750,452.

*To all whom it may concern:*

Be it known that I, JESS E. KING, of Syracuse, in the county of Onondaga, in the State of New York, have invented new and useful Improvements in Electric Load-Distributers, of which the following, taken in connection with the accompanying drawings, is a full, clear, and exact description.

This invention relates to certain improvements in electric load distributers as applied more particularly to separate sources of current supply merging into a common system of electrical distribution in which excessive and widely varying momentary loads are normally carried by one of the sources of current supply, while the other source is maintained as an emergency reserve power to supplement any deficiencies in the source of normal supply. For example, in the operation of municipal and other large public or private electrical distributing systems, where a widely varying load and maximum current consumption must be continuously provided for, it is frequently advisable and customary to normally supply such system with purchased current from some distant or more advantageous and economic source than could be obtained solely through the operation of a local generating plant and to keep the local plant in readiness to supply the system with the necessary current in case of failure of the normal supply. This purchased current is usually paid for on the basis of maximum or peak loads for relatively short time-intervals above a predetermined or estimated average load value for a much longer period of time and it therefore follows that if these peak loads, as registered or recorded by any of the well known registering or recording instruments, are excessive in any one or more of the shorter periods, the cost for the longer period will be proportionately excessive even though the indicated load value for the greater portion of the longer period may be far below the average.

In the drawings:—Figure 1 is a diagrammatic view of an electrical distributing system and load distributer connected therein, as applied to alternating current generators; Fig. 2 is a similar diagrammatic view of a direct and alternating current distributing system, and another form of load distributer connected therein.

The invention as illustrated diagrammatically in Fig. 1 of the drawings is applied to a distributing system comprising a receiving station A, receiving purchased current from a distant source, or electric generator T, over one or more circuit lines 1, and delivering the same or a transformed current over one or more transmission lines 2 to any number of similar or different translators or electric distributing systems 3, to which is also electrically connected an auxiliary current generator B for supplying current to said system when desired. For the sake of convenience, the generator T may be referred to as the main original source of supply, while the generator B may be referred to as the supplemental original source of supply. The station to which the purchased power is supplied may be termed the receiving station, while the supplemental source of supply may be termed the supplemental station, both sources of current supply being connected to the common distributing system.

The generator B, herein illustrated, is of the alternating current type, and may be driven by any suitable prime mover C, such, for example, as the usual governor controlled steam turbine engine, for impressing current on its line connection 4 with the distributing system through the medium of suitable switches and other apparatus which it may be necessary or desirable to incorporate in such connection.

The purchased current in the distributing system is normally taken through the receiving station from the main generator T at a price based upon any maximum momentary load which may be registered or recorded in excess of a predetermined value during a stipulated period of time, even though the load factor for the greater portion of this period is considerably below such value which results in a large aggregate yearly loss to the purchasers, proportionate to the difference between the excess load periods and stipulated load periods.

As previously stated, the supplemental generator is operated in conjunction with the main source of current supply delivered at the receiving station, so as to be in readiness to supply the necessary current to the distributing system in case of failure of the main source, and my purpose is to take advantage of this correlation of generating sources to maintain a more constant load of any predetermined value at any point in the circuit over which the purchased power is carried, by automatically distributing any and all excess loads above such value to the supplemental generator. This automatic control may be accomplished by a large variety of devices according to the nature of the current, that is, whether it is direct or alternating, single phase, two-phase or three-phase, but for the purposes of illustration, I have shown diagrammatically a Kelvin balance D, as installed at the supplemental station, and electrically connected by a system of, in this instance, six wires 5 and 13 to transformers 6 and the line at the receiving station. The Kelvin balance employed in connection with this particular embodiment of my invention consists of four stationary current coils $e$, $f$, $g$ and $h$ and two movable potential coils $a$ and $b$. The potential coils are mounted on opposite ends of the arm $c$, which through a bearing $k$ at its center is free to move between the stationary current coils $e$, $f$ and $g$, $h$. A contact finger 7 is fastened to the movable arm $c$ at a point between the bearing $k$ and the potential coil $a$. Adjustable screw contact points 8 are spaced apart to form an intervening air gap or neutral insulating space for the contact finger 7. The Kelvin balance is connected in circuit with the necessary transformers, as shown, and by means of the adjusting screws $p$, the spring $m'$ is set so as to balance when the desired load is on the receiving station; that is the potential coils $a$ and $b$ will take a position midway between the current coils $e$, $f$ and $g$, $h$ and the contact finger 7 will take a position midway between the contact points 8 when the desired load is on the receiving station.

Coöperating through a worm gear $j$ and a spring connection $x$ with the governor I of the prime mover or engine C is in this case a reversible electric motor E, which has two field windings $y$ and $z$. These field windings are so connected in circuit as to permit operating the motor in either direction, depending on the electrical connection made by the automatically operated reversing switch 10, which consists of two solenoids $o$ and $n$ arranged to act on the single armature $l$ which is a part of the single pole, double throw switch 10. Solenoids $o$ and $n$ are electrically connected by conductors 11 to the contact points 8, the contact finger 7 being connected by wire 12 in circuit with the contacts 8. The current sources $t$ and $t'$ for operating respectively the motor E and the automatically operated reversing switch 10 are in this case batteries.

It is now clear that the movable element of the Kelvin balance will change position when the load on the receiving station changes from the value for which the balance D is set. This change of position will cause the contact finger 7 of the Kelvin balance to make contact with one of the contact points 8, causing the switch 10 to make connection with one of the contact points 14 and thereby causing the motor E to be driven in one direction and when the contact finger 7 makes contact with the other terminal 8 the automatic controlling switch will be reversed to cause said motor to be driven in the opposite direction. The movement of the motor in one direction will through the worm gear $j$ and the connection $x$ shift the governor I of the prime mover or engine C to open the engine throttle increasing its speed and thereby cause the generator B to take on any excess of load; while, on the other hand, a driving of the motor E in the other direction will close the engine throttle and thus reduce the load on the engine and its generator and allow the load to be carried by the receiving station.

As previously stated, this reversal in operation of the motor acts upon the governor of the prime mover, tending to vary its speed and cause a corresponding variation of the load on its generator in proportion to the variation of load on the receiving station above or below the predetermined value at which the Kelvin balance is set, thereby keeping the purchase power on the receiving station source of supply approximately constant. For example, if the load on the receiving station exceeds the normal value, it will automatically cause the motor to rotate in one direction to open the engine throttle tending to increase its speed, and thereby cause the generator B to take on such excess of load, while on the other hand, if the load on the receiving station falls below the normal value, the action of the motor will be reversed to reduce the load on the engine and its generator, and allow the load to be carried by the receiving station supply. This is a particularly simple and highly efficient method of maintaining a substantially constant load on the receiving station, consequently keeping the cost of such power within the stipulated price of the predetermined load period factor, thus resulting in a large yearly saving to the purchasers of such power, but it is evident that the same object may be carried out by many other devices influenced by load variations in one part of the distributing system, which will automatically maintain an approximately constant load in any part of such system, or cause any excess load above a predetermined value in one part of the system to be automatically taken over by another part of such system. Furthermore, when the receiving and supplemental stations are separated many miles apart, it may be desirable or necessary to use transformers of high ratio, and low secondary current rating in order to reduce copper investment and losses in control lines. In this event, it will be necessary to use at the supplemental station step-up current transformers, thereby making it possible to use a standard Kelvin balance.

The load distributing device thus far described is adapted to be used more particularly in connection with an alternating current distributing system in which the load distributer is controlled by a Kelvin balance, but it will be clearly evident to those skilled in the art that the same degree of control may be obtained through the medium of a graphic watt meter.

In Fig. 2 of the drawings, I have shown my invention as applied to a system including a direct current distributing system which is supplied with current by a rotary converter R, receiving alternating current from the receiving station A through the transmission lines 2. In this application of my invention, there may be distributing lines 3, leading directly from the transmission lines 2, if desired. The rotary converter R delivers direct current to the distributing lines 3ª, which are also electrically connected to a supplemental direct current generator K. The direct current generator K is driven by a prime mover. In this direct current system, the arrangement of the substation control line is similar to that shown in Fig. 1 as far as the supplemental station at which is installed a Kelvin balance D'. This Kelvin balance has but two contacts $m$ and $n$, one of which $m$ is movable and normally held out of engagement with the contact $n$ by a spring $m'$, the tension of which may be adjusted at will by any well known means. Leading from these two contacts $m$ and $n$ are two wires $o$ terminating in an electrically operated short circuiting switch S, having an electro-magnet $s$ which is energized through a resistance $r$ from some suitable external source as $t$. Said resistance $r$ is short circuited by an electrical connection between the two contacts $m$ and $n$ of the Kelvin balance.

The switch magnet S is provided with an armature $s'$ carrying a contact $u$ co-acting with a relatively stationary contact $u'$, but normally held out of engagement therewith by a spring $v$, which is attached to said armature and serves to overcome the pull of the electro-magnet $s$ while the current is flowing through the resistance $r$ to said magnet. Connected across the contacts $u$ and $u'$ is a condenser W and two wires $w$ leading to the rheostat F of the direct current generator K.

The spring $m'$ of the Kelvin balance D is adjusted by the screw $p$ to set the movable element for the desired load on the receiving station; that is, the potential coils $a$ and $b$ will take a position midway between the current coils $e$, $f$ and $g$, $h$ and the contact $m$ which is fastened to the arm $c$ will not be in contact with the adjustable screw contact $n$. It is now clear that when the load on the receiving station increases it will cause the contact $m$ to move into engagement with contact $n$, thereby short circuiting the resistance $r$ and strengthening the current in winding $s$ to operate the switch for short circuiting the resistance F in the field circuit of generator K, thus causing this generator to supply current to the system, thus reducing the load on the receiving station, which in turn causes the Kelvin balance to disengage contacts 7 and 8, thus weakening the magnet $s$ to permit the switch controlled thereby to reinsert the resistance F to again reduce the voltage and output of generator K. The reduction in output of generator K again increases the demand on the receiving station, which again actuates the Kelvin balance D which cycle of operation is repeated, the periods of engagement of contacts $m$ and $n$ having such relation to the periods of disengagement that the excitation of generator $k$ is maintained at the proper value at all times to keep the power demand on the receiving station at a constant value.

From the above description, it will be apparent that in the two embodiments shown and described of my invention, I have provided a distributing system, wherein a main original source of supply and a supplemental original source of supply independent of said main source, operate in conjunction for supplying power to a distributing system and a load distributer consisting of a Kelvin balance, or its equivalent and parts actuated thereby, is operated by the increase or decrease in the power delivered by the main source of supply above or below a predetermined amount and this load distributer varies the power generated and supplied by the supplemental power supply to correspond with the fluctuating power demanded by the distributing system and thus the demand on the main supply is maintained substantially uniform.

What I claim is:

1. The combination with a main original source of supply, and a supplemental original source of supply independent of said main source of supply and operating in conjunction with said main source of supply for supplying power to a system, of a load distributer operated by the increase or decrease in the power delivered by the main source of supply above or below a predetermined amount for varying the power generated and supplied by the supplemental power supply to correspond with the fluctuating power demanded by the system whereby the demand on said main supply is maintained substantially uniform.

2. The combination with a main original source of supply, and a supplemental original source of supply independent of said main source of supply and operated in conjunction with said main source of supply for supplying power to a system, of a load distributer including a regulator for varying the power supplied by said supplemental power supply, and devices operated by the increase or decrease in the power delivered by the main source of supply above or below a predetermined amount for actuating said regulator to vary the power generated and supplied by said supplemental power supply to correspond with the fluctuating power demanded by the system whereby the demand on said main supply is maintained substantially uniform.

3. The combination with a main source of supply, a generator operating in conjunction with said main source of supply for supplying power to a system, and a prime mover for actuating said generator, of a load distributer comprising a regulator for varying the power generated by said generator, and devices controlled by the power supplied by the main source of supply for actuating said regulator to vary the power supplied by said generator, when the demand of the system is above a predetermined amount, to correspond with the fluctuating power demanded by the system, whereby the demand on said main supply is maintained substantially uniform.

4. The combination with a main source of supply, a generator operating in conjunction with said main source of supply for supplying power to a system, and a prime mover for actuating said generator, of a load distributer including a regulator for varying the power generated by the generator, and devices operated by the increase or decrease in the power delivered by the main source of supply above or below a predetermined amount for actuating said regulator to vary the power supplied by the generator to correspond with the fluctuating power demanded by the system whereby the demand on the main power supply is maintained substantially uniform.

5. The combination with a main source of supply, a generator operating in conjunction with said main source of supply for supplying power to a system, and a prime mover for actuating said generator, said prime mover having a governor for controlling the power of said prime mover, of a load distributer controlled by the power supplied by said main source of supply and operating through said governor to automatically cause the power demanded above a predetermined amount by said system to be supplied by said generator.

6. The combination of a main source of supply, a generator operating in conjunction with said main source of supply for supplying power to a system, and a prime mover for actuating said generator, said prime mover having a governor for controlling the power of said prime mover, of means for adjusting said governor for varying the power supply, and devices controlled by the power supplied by said main source of supply for operating said governor adjusting means whereby said generator is caused to automatically furnish the power demanded by the system in excess of a predetermined amount.

7. The combination with a main source of supply, a generator operating in conjunction with said main source of supply, for supplying power to the system, a prime mover for actuating said generator, means for varying the output of said generator, and means responsive to the power delivered by said main source of supply for controlling said generator output varying means.

8. In combination, a system of distribution, a main source of supply for said system, a generator operating in conjunction with said main source of supply for supplying power to said system, means independent of said main source of supply for actuating said generator, means for varying the output of said generator, and means responsive to the power delivered by said main source of supply to said system for controlling the generator output varying means.

In witness whereof I have hereunto set my hand.

JESS E. KING.

Witnesses:
H. E. CHASE,
EVA E. GREENLEAF.